(12) United States Patent  
Liu

(10) Patent No.: US 10,717,230 B2  
(45) Date of Patent: Jul. 21, 2020

(54) LINE LASER IMAGER FOR THERMOPLASTIC SELECTIVE LASER SINTERING

(71) Applicant: XEROX CORPORATION, Norwalk, NY (US)

(72) Inventor: Chu-heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 430 days.

(21) Appl. No.: 15/184,676

(22) Filed: Jun. 16, 2016

(65) Prior Publication Data

US 2017/0361530 A1 Dec. 21, 2017

(51) Int. Cl.
*B29C 64/153* (2017.01)
*B29C 64/268* (2017.01)
*B29C 64/20* (2017.01)
*B22F 3/105* (2006.01)
*B33Y 30/00* (2015.01)
*B33Y 10/00* (2015.01)
*B33Y 50/02* (2015.01)
*B29K 105/00* (2006.01)
*B29K 101/12* (2006.01)

(52) U.S. Cl.
CPC .......... *B29C 64/153* (2017.08); *B22F 3/1055* (2013.01); *B29C 64/20* (2017.08); *B29C 64/268* (2017.08); *B33Y 10/00* (2014.12); *B33Y 30/00* (2014.12); *B22F 2003/1056* (2013.01); *B29K 2101/12* (2013.01); *B29K 2105/251* (2013.01); *Y02P 10/295* (2015.11)

(58) Field of Classification Search
CPC ... B29C 64/153; B29C 64/268; B29C 64/277; B29C 64/282; B29C 64/20; B22F 3/1055; B22F 2003/1056; B33Y 10/00; B33Y 30/00; B33Y 50/02; Y02P 10/295; B29K 2101/12; B29K 2105/251
USPC ........................................................ 156/242
See application file for complete search history.

(56) References Cited

U.S. PATENT DOCUMENTS

| 6,717,106 | B2* | 4/2004 | Nagano | B23K 26/0604 219/121.65 |
| 2003/0052105 | A1* | 3/2003 | Nagano | B23K 26/0604 219/121.83 |
| 2015/0283612 | A1* | 10/2015 | Maeda | B22F 3/1055 425/78 |
| 2016/0067780 | A1* | 3/2016 | Zediker | B22F 3/1055 219/76.12 |
| 2016/0114427 | A1* | 4/2016 | Eibl | B22F 3/1055 419/7 |
| 2016/0121430 | A1* | 5/2016 | Deiss | B22F 3/1055 219/76.12 |

(Continued)

*Primary Examiner* — Sing P Chan
(74) *Attorney, Agent, or Firm* — Caesar Rivise, PC

(57) ABSTRACT

A method for printing an object using a high power one-dimensional (1D) line laser imager for selective laser sintering of thermal plastics. The technique is a two-step process. First, a layer of fresh powder is deposited on top of an existing powder bed. Second, the powder is sintered with the line laser print head. The laser is modulated at the source or with a spatial light modulator. Multiple passes or imagers can be used for increased part width and productivity. Using the relative travel between energy receiving surface and the laser print head in the direction perpendicular to the laser imaging line, a 2D pattern is imaged. Multiple print head can be aligned and joined to form a wider laser print head.

18 Claims, 8 Drawing Sheets

(56) References Cited

U.S. PATENT DOCUMENTS

| | | | |
|---|---|---|---|
| 2016/0158889 A1* | 6/2016 | Carter | B29C 64/20 |
| | | | 219/76.12 |
| 2016/0184925 A1* | 6/2016 | Huang | B23K 26/342 |
| | | | 419/53 |
| 2016/0279707 A1* | 9/2016 | Mattes | B41J 2/451 |
| 2017/0021455 A1* | 1/2017 | Dallarosa | B33Y 10/00 |
| 2017/0036398 A1* | 2/2017 | Gumennik | B33Y 10/00 |
| 2017/0217099 A1* | 8/2017 | Chou | B29C 64/268 |
| 2018/0207722 A1* | 7/2018 | Feldmann | B29C 64/20 |

* cited by examiner

LINE LASER IMAGER FOR THERMOPLASTIC SELECTIVE LASER SINTERING

BACKGROUND OF THE INVENTION

Disclosed herein are methods directed to additive manufacturing and the use of powder materials such as thermoplastic particles in additive manufacturing processes, and in particular to such methods using laser line scanning large areas for fast 3D molding, as well as corresponding apparatus and computer-readable medium.

Additive manufacturing has been used for many years. Fabricated parts have been produced using various printing techniques (e.g., three-dimensional or 3D printing techniques). For example, sheeting welding, wire welding, melting in powder beds or powder deposition via laser and electron beam melting, injections using powder, liquid ultra violet curable resins, and fusible thermoplastic filaments have all been used. These techniques have varying degrees of geometric complexity, but generally have few restrictions in comparison to conventional machining Each type of technique has associated with it advantages and disadvantages, particularly with respect to solid state processing, fine grain structures, and mechanical properties.

3D printing technology is the new rapid prototyping (RP). Selective laser sintering (SLS) is one major 3D printing technology for thermoplastics, polymers, synthetic resins and metals. It typically uses a single spot laser to scan the top layer of the powder during the 3D building process. Its productivity is limited by a number of engineering challenges such as: data rate, scanning speed, resolution, size and the like. It is further limited by technology challenges such as the balance of energy density and power density. It is common that SLS for metal can reach a few thousand watts. However, the maximum power for a thermoplastic SLS machine is around a few hundred watts.

BRIEF SUMMARY OF THE INVENTION

According to aspects of the embodiments, there is provided methods of using a high power one-dimensional (1D) line laser imager for selective laser sintering of thermal plastics. The technique is a two-step process. First, a layer of fresh powder is deposited on top of an existing powder bed. Second, the powder is sintered with the line laser print head. The laser can be modulated at the source or with a spatial light modulator. Multiple passes or imagers can be used for increased part width and productivity. When a relative travel is introduced between energy receiving surface and the laser print head in the direction perpendicular to the laser imaging line, a 2D pattern is imaged. Multiple print head can be aligned and joined to form a wider laser print head.

DETAILED DESCRIPTION OF THE INVENTION

Figure 1:
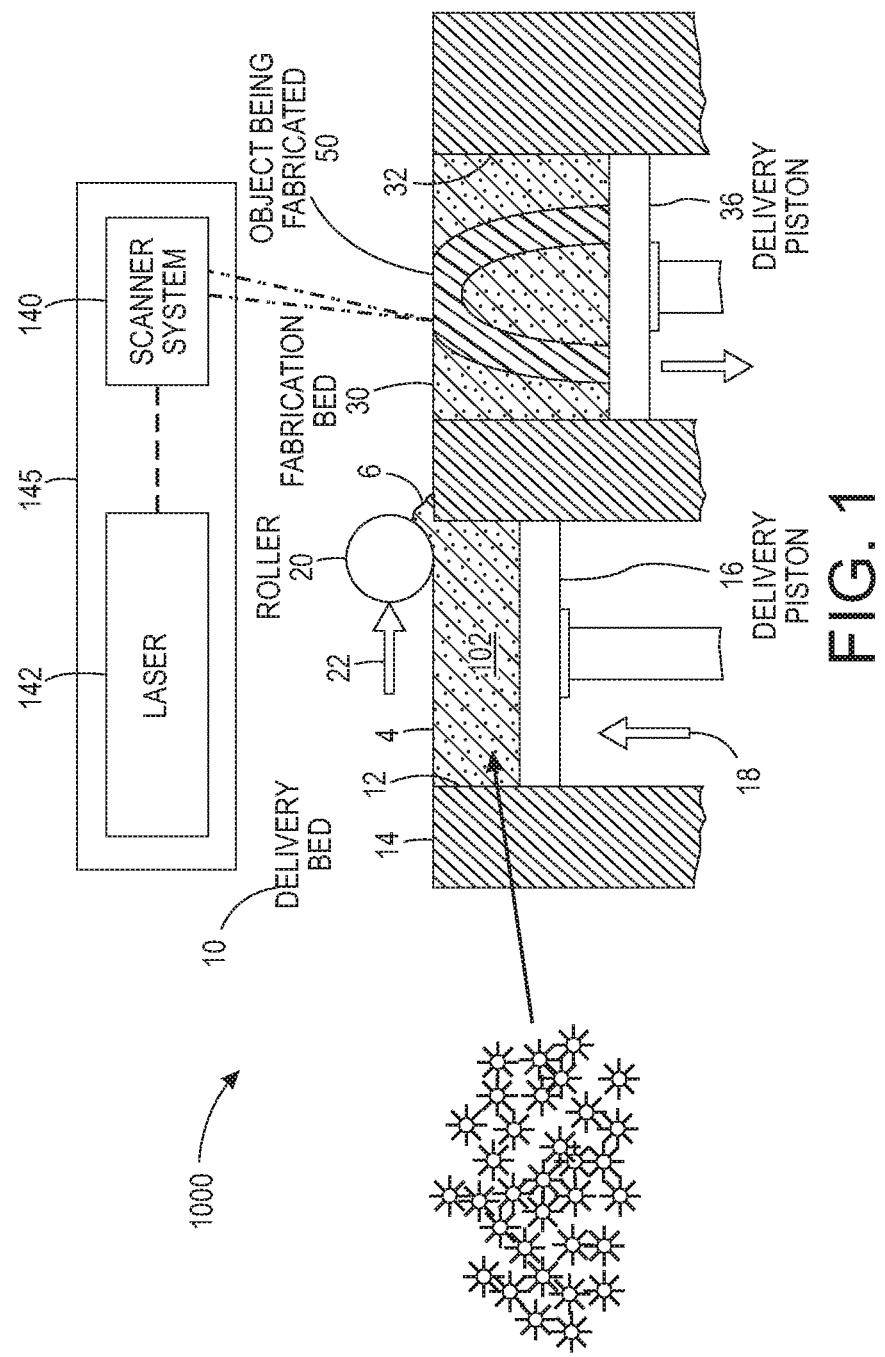
FIG. 1 illustrates a block diagram of a system for printing 3D objects in accordance to an embodiment.

Aspects of the embodiments disclosed herein relate to methods for selective laser sintering of thermal plastics, and corresponding apparatus and computer readable medium. The disclosed embodiments include a high productivity technique to manufacture parts with selective laser sintering. High productivity is attained without having to significantly change the process by using an anamorphic projection system.

Exemplary embodiments are intended to cover all alternatives, modifications, and equivalents as may be included within the spirit and scope of the composition, apparatus and systems as described herein.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof. In the drawing, like reference numerals are used throughout to designate similar or identical elements.

Example 1 includes a method for printing an object with a 3D printer, comprising loading a plurality of powder particles into a delivery bed of the 3D printer; transferring a portion of the powder particles from the delivery bed to a powder bed of the 3D printer; and sintering the powder particles in the powder bed by using a line laser print head to form the printed object; wherein the transferring is preparing a layer of fresh powder on top of existing powder bed; wherein the line laser print head can take a simple linear motion to complete a raster scan of an area equal to its width; wherein a relative distance between the line laser print head and fabrication bed is adjusted to accommodate a thickness for each powder layer in the fabrication bed.

Example 2 includes Example 1 and wherein the line laser print head causes at the powder bed a laser imaging line with high resolution spatial/temporal power modulation.

Example 3 includes Example 2 and wherein the line laser print head comprises one or an array of lasers.

Example 4 includes Example 3 and wherein a laser is one or more carbon dioxide ($CO_2$), neodymium-doped yttrium aluminum garnet (Nd:YAG) laser, diode laser, diode laser bar, near IR diode laser, or a combination thereof.

Example 5 includes Example 4 and further comprising causing a 2D pattern image on the powder bed by energizing and moving the line laser print head in a direction perpendicular to the laser imaging line.

Example 6 includes Example 5 and wherein each laser corresponds to a pixel of the laser imaging line.

Example 7 includes Example 6 and wherein light energy from a laser source is modulated at the laser source.

Example 8 includes Example 3 and further comprising using a plurality of light modulating elements arranged in a two-dimensional array and disposed in a homogenous light field such that each said modulating element receives an associated homogenous light portion of the homogenous light field; wherein each modulating element modulates an associated received homogenous light portion such that an associated modulated light portion is directed in a corresponding predetermined direction.

Example 9 includes Example 8 and further comprising using an anamorphic optical system arranged to concentrate said modulated light portions such that the concentrated modulated light portions produce an elongated scan line on the powder bed; wherein at the elongated scan line said modulated light portions sinter the powder particles in the powdered bed.

Example 10 includes a single-pass imaging system for forming a printed object by exposing a powder bed with a patterned light, comprising a line laser print head to expose predetermined regions corresponding to a plurality of pixels on a surface of the powder bed with a beam, which has a wavelength in a predetermined wavelength region that includes ultraviolet, and which is emitted from a light source and modulated for each pixel in accordance with image data; at least one processor; and at least one memory including computer program code for one or more programs, the at least one memory and the computer program code configured to, with the at least one processor, cause the system to perform at least the following: transferring a portion of stabilized particles from a delivery bed to the powder bed; sintering the stabilized particles in the powder bed by using the line laser print head to form the printed object; wherein the transferring is preparing a layer of fresh powder on top of existing powder bed; wherein the line laser print head can take a simple linear motion to complete a raster scan of an area equal to its width; wherein a relative distance between the line laser print head and fabrication bed is adjusted to accommodate a thickness for each powder layer in the fabrication bed.

Example 11 includes a non-transitory computer-readable medium storing instructions for controlling a single-pass imaging system for forming a printed object by exposing a powder bed with a homogenous light, the instructions comprising loading a plurality of stabilized particles into a delivery bed of the 3D printer; transferring a portion of the stabilized particles from the delivery bed to a powder bed of the 3D printer; and sintering the stabilized particles in the powder bed by using a line laser print head to form the printed object; wherein the transferring is preparing a layer of fresh powder on top of existing powder bed; wherein the line laser print head can take a simple linear motion to complete a raster scan of an area equal to its width; wherein a relative distance between the line laser print head and fabrication bed is adjusted to accommodate a thickness for each powder layer in the fabrication bed; wherein the line laser print head causes at the powder bed a laser imaging line with high resolution spatial/temporal power modulation; wherein the line laser print head comprises one or an array of lasers; wherein a laser is one or more $CO_2$, Nd:YAG laser, diode laser, diode laser bar, near IR diode laser, or a combination thereof.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations. The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

As used herein, unless otherwise specified, the word "printer" encompasses any apparatus that performs a print outputting function for any purpose, such as a digital copier, bookmaking machine, facsimile machine, a multi-function machine, electrostatographic device, 3D printer that can make a 3D objects, and the like. It will be understood that the structures depicted in the figures may include additional features not depicted for simplicity, while depicted structures may be removed or modified.

The 3D printing process using a line laser print head is similar to a standard Selective Laser Sintering (SLS), which may include preparing a layer of fresh powder on top of an existing powder bed, sintering the powder with the line laser print head, and, repeating the process until finished. To accommodate the thickness of each powder layer, the powder bed or print head is moved vertically between the steps. SLS is applicable to both metal and thermoplastics. The only significance difference is that metal SLS can reach a few thousand watts and thermoplastic SLS is around a few hundred watts.

Thermoplastic SLS is fundamentally challenged by a process physics problem: the limit on power density to prevent the burning/degradation of the build material. In order to sinter/melt the thermal plastic material, a certain amount of energy needs to be delivered to a certain area (Energy/Area) to raise the temperature of a layer of the material. If one increases the speed, while increasing the laser power accordingly, this energy density requirement can be met. However, the power density (Power/Area, Watts/$mm^2$) increases proportionally. The increased power density will cause the energy/heat to concentrate more and more on the top surface, causing the overheating of the material sitting on the top of the powder bed. There is proposed and described in the various embodiments using a high power 1D line laser imager for Selective Laser Sintering of thermal plastics by producing an imaging area that is a line with high resolution spatial/temporal power modulation.

FIG. 1 depicts an illustrative 3D printer 1000 for printing 3D objects, according to one or more embodiments disclosed. The printer 1000 may include a delivery bed 10 defined by one or more sidewalls 12 and a delivery piston 16. The powder material (e.g., the matrix) 102 may be loaded into the delivery bed 10 in powder and/or paste form. Once loaded, the upper surface 4 of the powder material 102 may be even with or below the upper surface 14 of the sidewall 12. The delivery piston 16 may then move upwards in the direction of arrow 18 until the upper surface 4 of the powder particles 102 is even with or above the upper surface 14 of the sidewall 12. The powder particles can be thermoplastic, plastic, metal, or a combination thereof in various forms, size and shapes.

Figure 7:
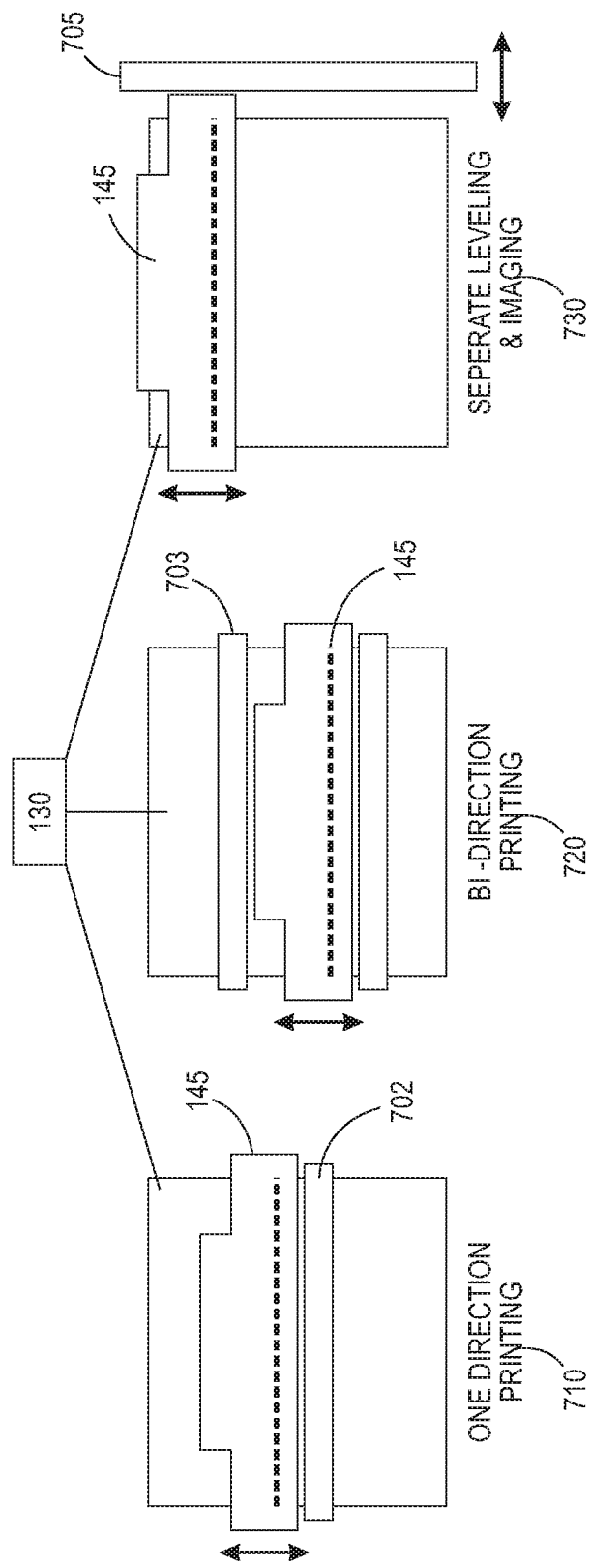
FIG. 7 illustrates three implementations for the motion of a leveler and the line laser print head in accordance to an embodiment.

A transfer member (e.g., a roller) 20 and 702 in FIG. 7 may then transfer a portion 6 of the powder materials 102 above the upper surface 14 of the sidewall 12 from the delivery bed 10 into a fabrication bed 30 (e.g., in the direction of the arrow 22). The fabrication bed 30, which is also known as a powder bed, is primarily used in connection with the 3D Printing process after the powder bed is built up by the repeated application of layers of stabilized particles. The fabrication bed 30 may be defined by one or more sidewalls 32 and a fabrication piston 36. The transferred portion 6 of the powder materials 102 may form a first layer in the fabrication bed 30 that has a thickness from about 10 µm to about 50 µm, about 50 µm to about 100 µm, about 100 µm to about 250 µm, or more.

A scanning system 140 in the line laser print head 145 may scan the powder materials 102 in the first layer, and a laser 142 may then sinter the first layer in response to the scan results. The laser 142 may be one or more $CO_2$, Nd:YAG laser, diode laser, diode laser bar, near IR diode laser, or a combination thereof. The laser 142 may be a continuous wave laser or a pulse laser. When the laser 142 is a pulse laser, the pulse length and intervals may be adjusted for proper sintering by controller 300. The sintering may take place at a temperature about 200° C. for Nylon powders. Once the first layer has been sintered in the fabrication bed 30, the delivery piston 16 may then move upwards again in the direction of the arrow 18 until the upper surface 4 of the powder materials 102 is again even with or above the upper surface 14 of the sidewall 12 of the delivery bed 10. The fabrication piston 36 may move downwards. The transfer member 20 may then transfer another portion of the powder materials 102 that are above the upper surface 14 of the sidewall 12 from the delivery bed 10 into the fabrication bed 30 to form a second layer that is on and/or over the first layer. The laser 142 may then sinter the second layer. This process may be repeated until the desired 3D object (50) is produced.

Figure 2:
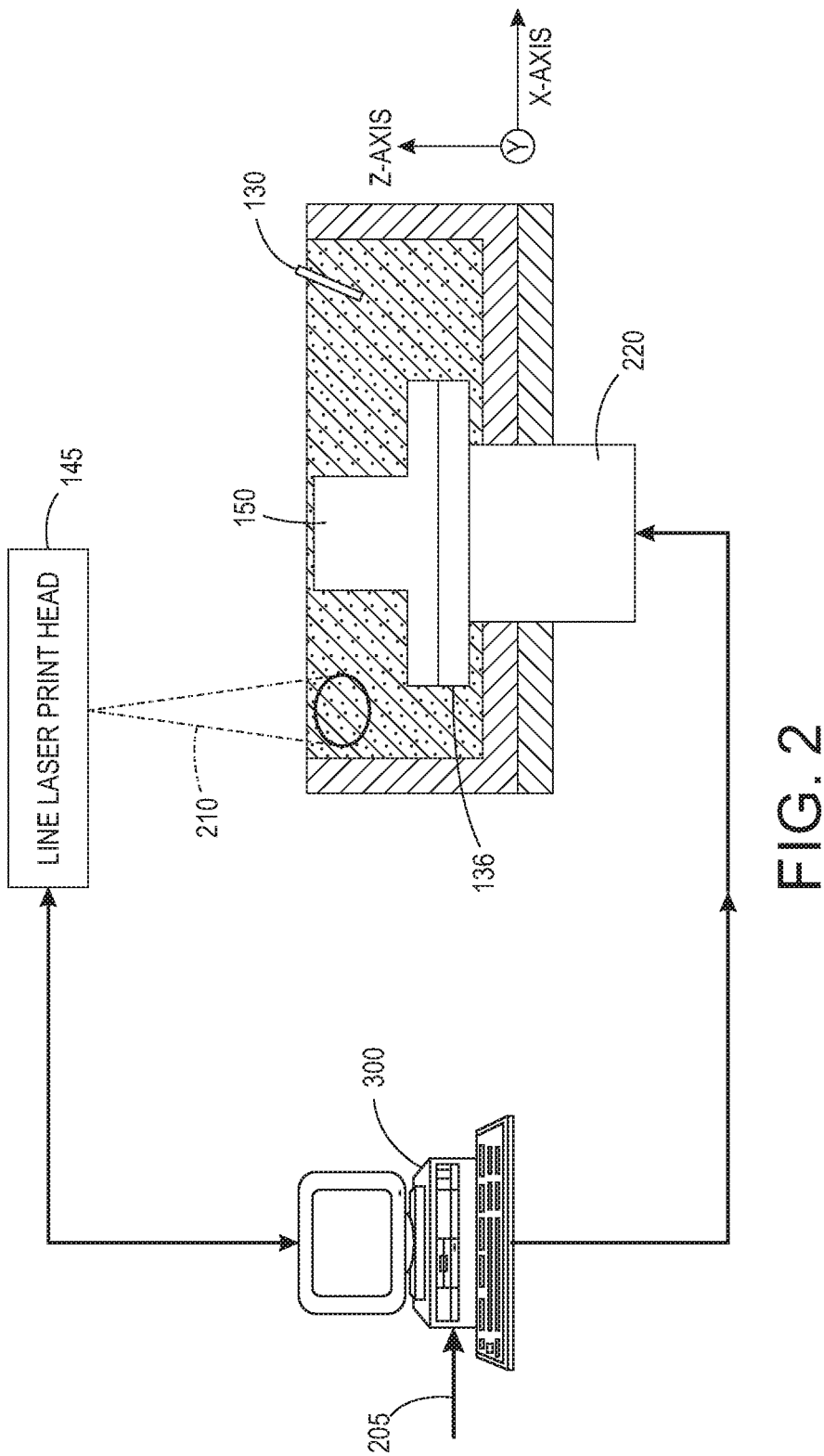
FIG. 2 illustrates a block diagram of a computer controlled line laser print head, powder bed, molded part, and movement device in accordance to an embodiment.

FIG. 2 illustrates a block diagram of a computer controlled line laser print head, powder bed, molded part, and movement device in accordance to an embodiment. Controller 300 uses a 3D model of the object being printed by receiving an external file 205 or by generating a suitable file using controller 300 with software packages like AutoCAD from Autodesk, Inc., SolidWorks from Dassault Systèmes SolidWorks Corp., TopSolid from Missler Software Corp., Cinema 4D from Maxon Computer GmbH, Google SketchUp from Google, Inc., and so on, and virtual worlds, such as Second Life from Linden Research, Inc. (Linden Labs®), Project Wonderland from Sun Microsystems, Inc., Qwaq Forums from Qwaq, Inc., and the like.

As shown in FIG. 2, the computer controlled line laser print head of an embodiment of the invention has a fabrication piston 136 provided with a floor 220, which lowers according to laser sintering, and a feed cylinder (roller 20) for supplying materials set to the both sides of the fabrication piston 136 at the center of a forming chamber for an object being fabricated 150. The line laser print head 145 exposes a region 210 having a predetermined area corresponding to a plurality of pixels on the surface of the powdered body (object 150) by a laser (142 at FIG. 1) that is set above the surface of the powdered body housed on the part cylinder. The line laser print head 145 is set so that it can be moved by an XY-positioning mechanism (not shown) in the horizontal direction (XY directions) to the surface of the powdered body. After completion of each layer a two-dimensional (2D) model is formed on a line by line basis, the relative distance between the line laser print head 145 and fabrication bed 30 is adjusted to accommodate a thickness for each powder layer in the fabrication bed. This adjustment is accomplished under computer control (controller 300) in the Z-axis by using Z-positioning mechanism 220 to move (incremental distance) the fabrication bed layer by layer to achieve mobile scanning irradiation that results in the evaporation of particles. When the three-dimensional model (3D model at controller 300) layer by layer is sliced and produced into the two-dimensional image scanning illumination (2D model) shape given a three-dimensional model of the entire entity by movement of the Z-positioning mechanism 220.

Figure 3:
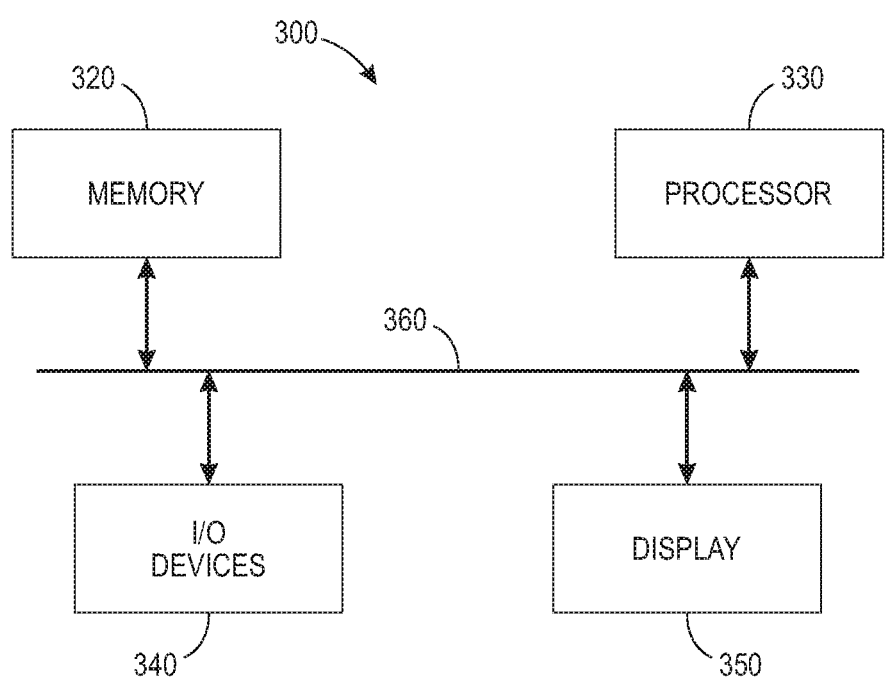
FIG. 3 illustrates a block diagram of a controller with a processor for executing instructions to automatically control devices in the apparatus illustrated in FIG. 1 or FIG. 2 in accordance to an embodiment.

FIG. 3 illustrates a block diagram of a controller with a processor for executing instructions to automatically control devices in the apparatus illustrated in FIG. 1 or FIG. 2 in accordance to an embodiment.

FIG. 3 illustrates a block diagram of a controller 300 with a processor for executing instructions to automatically control devices in the apparatus illustrated in FIG. 1 in accordance to an embodiment.

The controller 300 may be embodied within devices such as a desktop computer, a laptop computer, a handheld computer, an embedded processor, a handheld communication device, or another type of computing device, or the like. The controller 300 may include a memory 320, a processor 330, input/output devices 340, a display 350 and a bus 360.

The bus 360 may permit communication and transfer of signals among the components of the controller 300 or computing device.

Processor 330 may include at least one conventional processor or microprocessor that interprets and executes instructions. The processor 330 may be a general purpose processor or a special purpose integrated circuit, such as an ASIC, and may include more than one processor section. Additionally, the controller 300 may include a plurality of processors 330.

Memory 320 may be a random access memory (RAM) or another type of dynamic storage device that stores information and instructions for execution by processor 330. Memory 320 may also include a read-only memory (ROM) which may include a conventional ROM device or another type of static storage device that stores static information and instructions for processor 330. The memory 320 may be any memory device that stores data for use by controller 300.

Input/output devices 340 (I/O devices) may include one or more conventional input mechanisms that permit data between component of apparatus 10 and for a user to input information to the controller 300, such as a microphone, touchpad, keypad, keyboard, mouse, pen, stylus, voice recognition device, buttons, and the like, and output mechanisms for generating commands, voltages to power actuators, motors, and the like or information to a user such as one or more conventional mechanisms that output information to the user, including a display, one or more speakers, a storage medium, such as a memory, magnetic or optical disk, disk drive, a printer device, and the like, and/or interfaces for the above. The display 350 may typically be an LCD or CRT display as used on many conventional computing devices, or any other type of display device.

The controller 300 may perform functions in response to processor 330 by executing sequences of instructions or instruction sets contained in a computer-readable medium with readable program code, such as, for example, memory 320. Such instructions may be read into memory 320 from another computer-readable medium, such as a storage device, or from a separate device via a communication interface, or may be downloaded from an external source such as the Internet. The controller 300 may be a stand-alone controller, such as a personal computer, or may be connected to a network such as an intranet, the Internet, and the like. Other elements may be included with the controller 300 as needed.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages like Perl or Python. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The memory 320 may store instructions that may be executed by the processor to perform various functions. For example, the memory may store instructions to layer down a fresh layer of powder material. Maneuver or change the height distance between the line laser print head and the powder bed surface. Instructions to control the print heads, motion of the powder bed, and to convert the electronic image signals 220 into control commands for the print heads.

Figure 4:
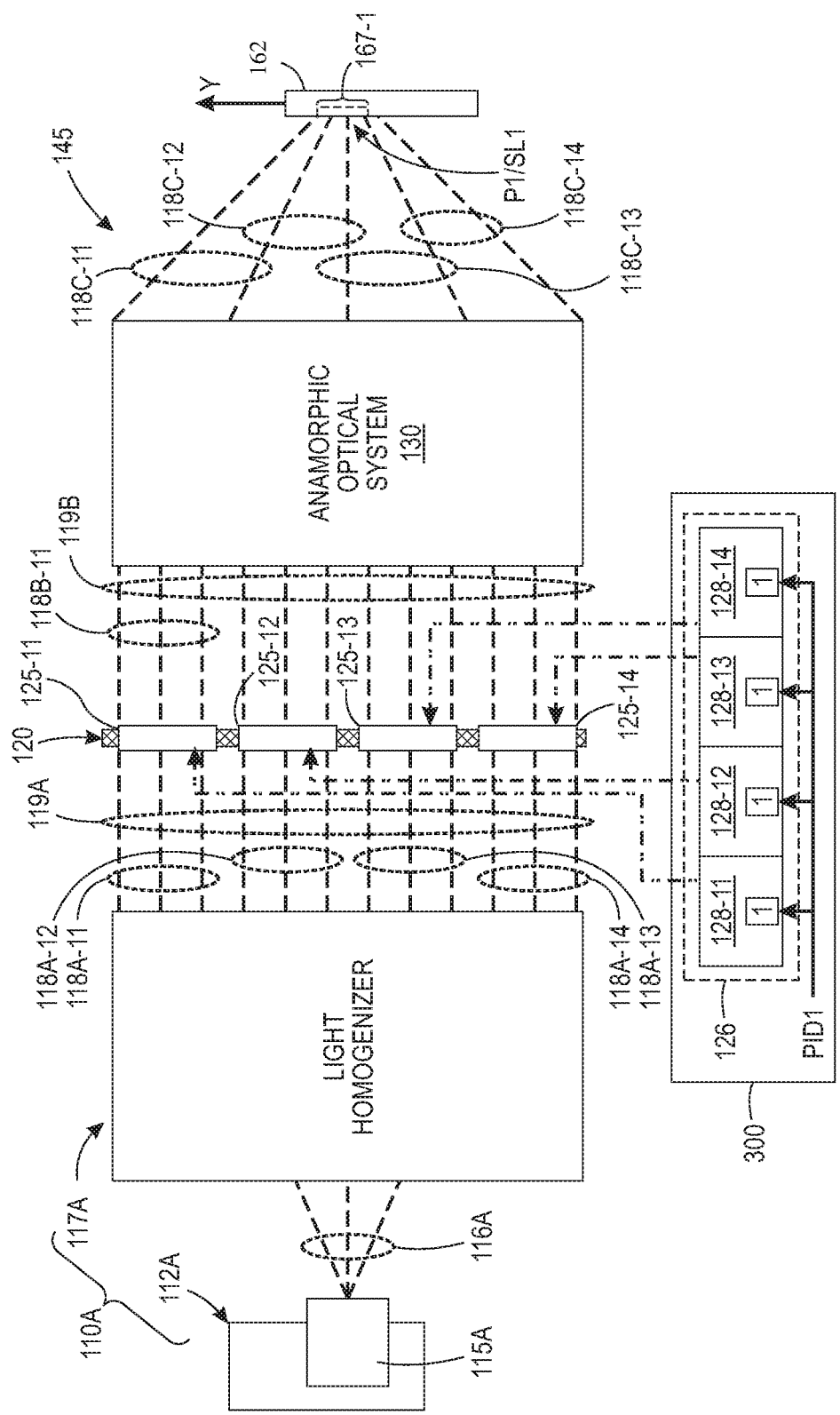
FIG. 4 is a simplified side view showing the imaging system of FIG. 1 or FIG. 2 during an imaging operation in accordance to an embodiment.

FIG. 4 is a simplified side view showing the imaging system of FIG. 1 or FIG. 2 during an imaging operation in accordance to an embodiment. FIG. 4 is a simplified side view showing an imaging system for the line laser print head 145 according to an embodiment of the present invention. Simplified line laser print head 145 generally includes a homogenous light generator 110, a spatial light modulator 120 that is controlled as described below by a controller 300 to modulate homogeneous light 118A received from homogenous light generator 110, and an anamorphic optical system 130 that images and concentrates modulated light 118B as described below to generate a scan line image SL on imaging surface such as fabrication bed 30. Homogenous light generator 110A (laser 142 at FIG. 1) includes a light source 112A including a light generating element (e.g., one or more lasers or light emitting diode) 115A fabricated or otherwise disposed on a suitable carrier (e.g., a semiconductor substrate) 111A, and a light homogenizing optical system (homogenizer) 117A. Homogenizer 117A then generates homogenous light 118A by homogenizing (i.e., mixing and spreading out light beam 116A over an extended two-dimensional area) as well as reducing any divergences of light beams 116. Those skilled in the art will recognize that this arrangement effectively coverts the concentrated, relatively high energy intensity high divergence of light beam 116A into dispersed, relatively low energy flux homogenous light 118A that is substantially evenly distributed onto all modulating elements (e.g., modulating elements 125-11 to and 125-34) of spatial light modulator 120. Spatial Light modulator 120 converts homogenous light field 119A into a two-dimensional modulated light field 119B that is projected through anamorphic optical system 130 onto an elongated imaging region 167 of imaging surface 162. Note that modulated light portions that have passed through anamorphic optical system 130 but have not yet reached imaging surface 162 are referred to as concentrated modulated light portions (118C-11 . . . 118C-14) like for example modulated light portion 118B-11 becomes concentrated modulated light portion 118C-11 between anamorphic optical system 130 and imaging surface 162. Note that light homogenizer 117A can be implemented using any of several different technologies and methods known in the art including but not limited to the use of a fast axis concentrator (FAC) lens together with microlens arrays for beam reshaping, or additionally a light pipe approach which causes light mixing within a waveguide.

The spatial light modulator 120 is implemented using commercially available devices including a digital micromirror device (DMD), such as a digital light processing (DLP®) chip available from Texas Instruments of Dallas, Tex., USA, an electro-optic diffractive modulator array such as the Linear Array Liquid Crystal Modulator available from Boulder Nonlinear Systems of Lafayette, Colo., USA, or an array of thermo-optic absorber elements such as Vanadium dioxide reflective or absorbing mirror elements. Other spatial light modulator technologies may also be used. While any of a variety of spatial light modulators may be suitable for a particular application, many print/scanning applications today require a resolution 1200 dpi and above, with high image contrast ratios over 10:1, small pixel size, and high speed line addressing over 30 kHz. Based on these specifications, the currently preferred spatial light modulator is the DLP™ chip due to its best overall performance.

As shown in FIG. 4, controller 300 comprises control circuit 126 includes an array of control (memory) cells 128-11 to 128-34 that store one line image data portion (e.g., line image data portion LIN1) during each imaging phase of an imaging operation. For example, at a given time, line image data portion LIN1 is transmitted (written) from controller 300 to control circuit 126 using known techniques, and line image data portion LIN1 is used to generate a corresponding line image SL in an elongated imaging region 167 of imaging surface 162. During a subsequent imaging phase (not shown), a second line image data portion is written into control circuit 126 (i.e., line image data portion LIN1 is overwritten), and a corresponding second line image (not shown) is generated in another elongated imaging region of imaging surface 162. Note that this process requires movement (translation) of fabrication bed 30 or line laser print head 145 in the process (Y-axis) direction after line image SL is generated and before the second line image is generated. Those skilled in the art will recognize that, by repeating such imaging phases for each scan image data portion LIN1-LINn of image data file ID, the associated two-dimensional image is generated on fabrication bed 30. Also, it is noted that move the powder bed or the line print head vertical position (Z-axis in FIG. 2) between the line images to accommodate the thickness of each powder layer.

Anamorphic projection system (anamorphic optical system 130) is an optical projection system that has unequal magnifications along two axes (X-Y) perpendicular to each other. It is particularly useful for the construction of the line laser print head 145 for this 3D printing application.

As known to those in the art, the most commonly available Spatial Light Modulators (SLM) are made for video display projection and comprise a matrix of imaging elements, i.e., a 2D matrix. To create a high intensity laser line of sufficient width, the total power is very high. To avoid damaging the SLM, the power needs to spread across as many imaging elements as possible. However, if the laser spread over a 2D area on the SLM, it is hard to produce a high intensity line with conventional projection system to accomplish the desired sintering. For example, a DMD with 1024×768 micromirrors, if the laser focuses on a single roll of 1024×1 micromirrors, the input power is very limited. Spreading the laser over 100 rolls (1024×100 micromirrors), the power limit is significantly increased, but with conventional optical projection, the projected laser pattern is too wide to form a high intensity line. To solve the power limitation, an optical system with independent imaging/magnification for both X and Y directions is needed and a simplified optical lens system is shown in FIGS. 5 and 6.

Figure 5:
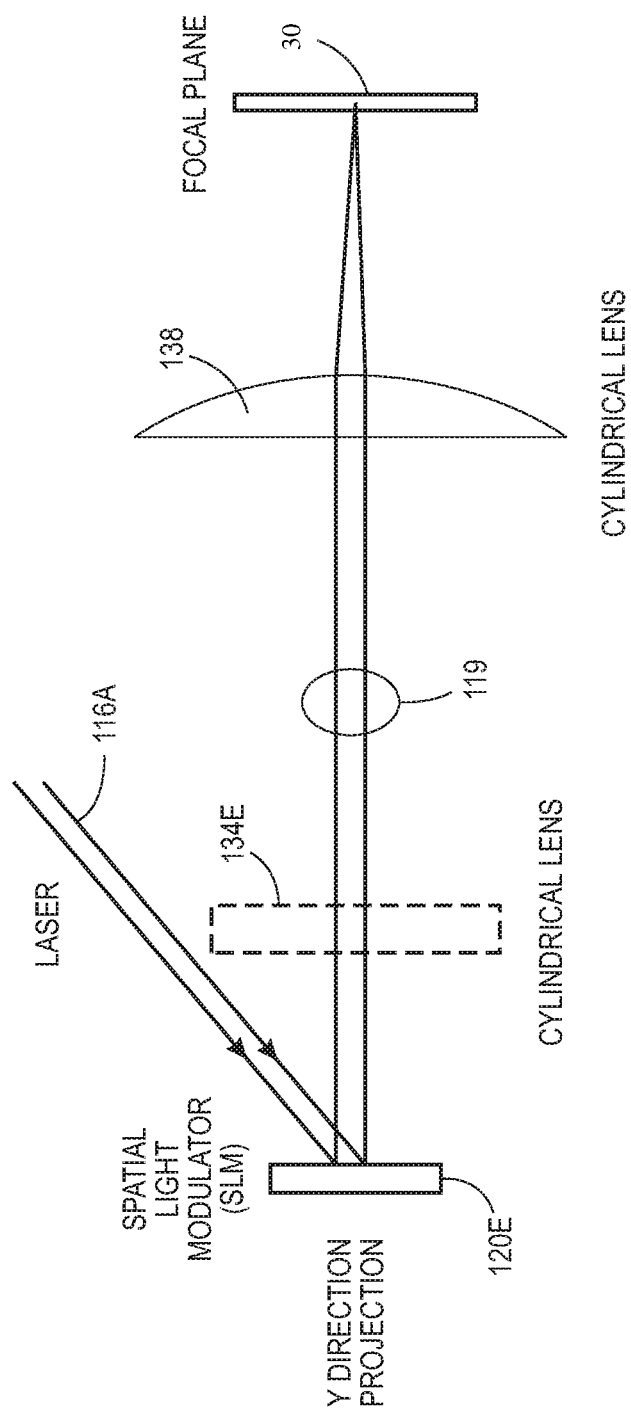
FIG. 5 illustrate the optical imaging/magnification system in the Y direction in accordance to an embodiment.

FIG. 5 illustrates the optical imaging/magnification system in the Y direction in accordance to an embodiment. FIG. 6 illustrates the optical imaging/magnification system in the X direction in accordance to an embodiment. First laser 142 emits a narrow rectangle shaped laser beam onto SLM 120E, which can be transmission type or reflection type to produce a modulated light field 119. The illustration shows a reflection type, for example, a DMD (Digital Micromirror Device by TI). The laser beam may cove 1024×100 mirrors. It is far away from a line source. Let's denote the Y direction as the height of 100, and X direction as the width of 1024. Use a set of cylindrical lenses (134E, 138) to construct an anamorphic projection system that makes the magnification in X (MagX) significantly greater than the magnification in Y (MagY) at fabrication bed 30. In addition, it is important to make the magnification in Y much smaller than 1 to form a line and increase the laser intensity. In the illustration at FIG. 5, the MagY is significantly less than 1 while MagX at FIG. 6 is significantly greater than 1.

Figure 6:
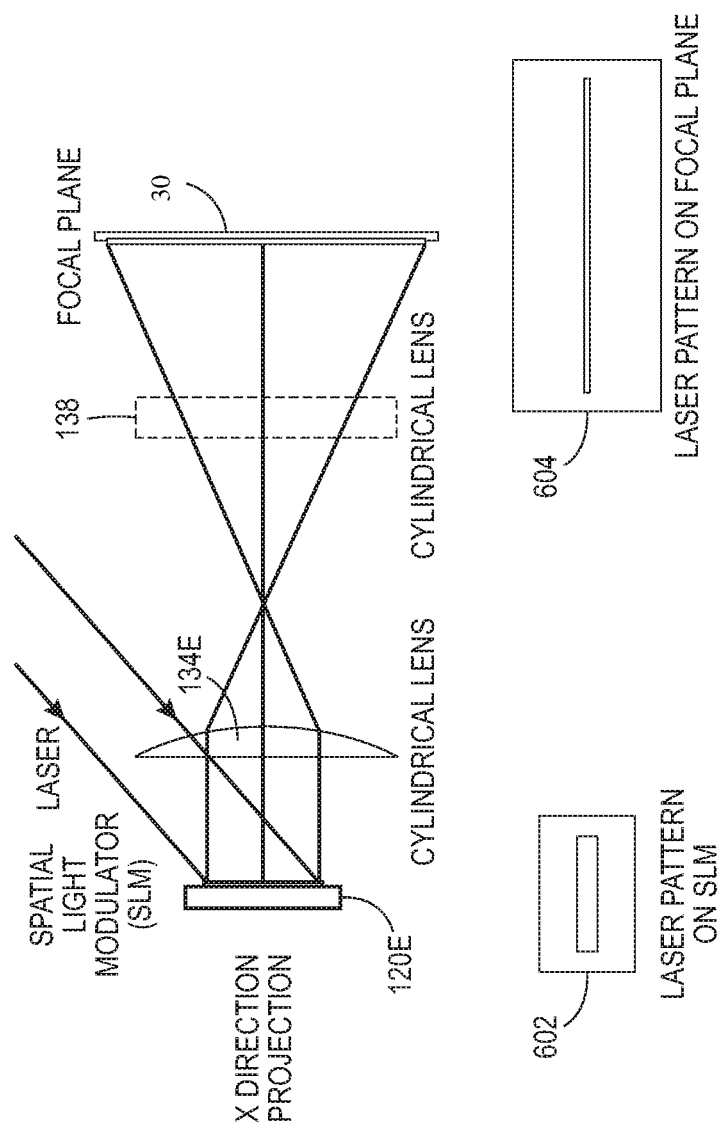
FIG. 6 illustrates the optical imaging/magnification system in the X direction in accordance to an embodiment.

Also shown at the bottom of FIG. 6, the laser pattern 602 on the SLM 120E and the laser pattern 604 on the projected focal plane at fabrication bed 30. As can be seen, the laser pattern 602 becomes a narrow, high intensity beam as desired at the fabrication bed 30. For example, if MagX=5 and MagY=0.1, each micromirror has a side length of ~10 µm, the projected patterns will be 51.2 µm×0.1 µm.

It is possible to modulate the output line power by modulation at SLM 120E. For example, SLM 120E can turn on/off each pixel of the output laser line by turning on/off the corresponding column (along Y direction) of 100 micromirrors. SLM 120E can produce 100 different levels of power output at each pixel by turning on the corresponding faction of the micromirrors in the column. The optical system is able to cause at the powder bed (fabrication bed 30) a laser imaging line with high resolution spatial/temporal power modulation. To make an even wider imager without sacrificing resolution or power density, a number of narrow width imagers can be stitched together to cover a greater width or form a full width device.

FIG. 7 illustrates three implementations for the motion of power leveling device (leveler) and the line laser print head in accordance to an embodiment. Next, another embodiment of the present invention will be described. Note that portions which are the same as those in the previous embodiments described above are denoted by the same reference numerals, and descriptions of the same portions as those as in the first embodiment will be omitted.

FIG. 7 illustrates a one direction printing 710 arrangement where roller 702, which is the same as roller 20 of FIG. 1, is capable of powder material supplying and performing leveling functions. A bi-direction printing 720 is shown with double rolls 703 that are each capable of powder material supplying and performing leveling functions. An arrangement for performing separate leveling and imaging 730 with the use of a roll 705 capable of performing powder material supplying and performing leveling functions.

Figure 8:
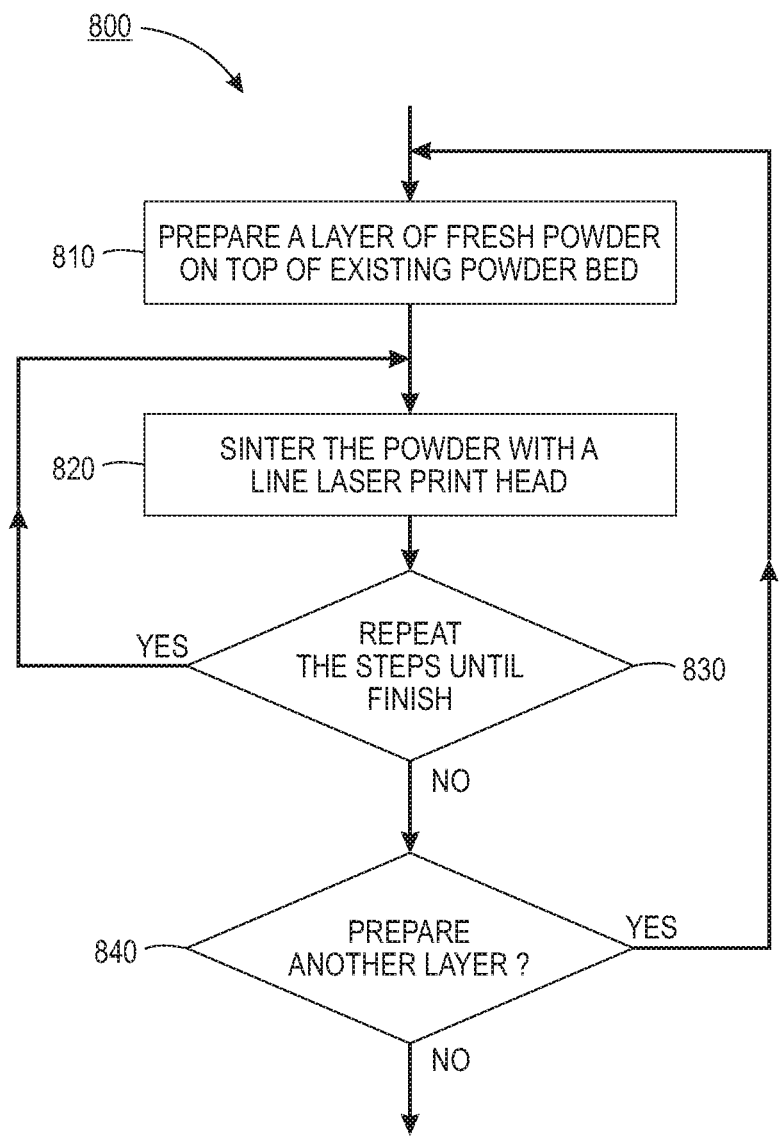
FIG. 8 illustrates a flowchart of a method for printing an object with a 3D printer in accordance to an embodiment.

FIG. 8 illustrates a flowchart of method/process 800 for printing an object with a 3D printer in accordance to an embodiment. In action 810, the process prepares a layer of fresh powder on top of existing powder bed; in action 820, the process sinters the powder with a line laser print head; in action 830, the process repeats the steps until finish; and in action 840 the process determines if it needs to prepare another layer of the powder bed and when the determination is "YES" the process goes back to action 810 for further processing.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for printing an object with a 3D printer, comprising:
    loading a plurality of powder particles into a delivery bed of the 3D printer;
    transferring a portion of the powder particles from the delivery bed to a powder bed of the 3D printer;
    wherein the transferring is preparing a layer of fresh powder on top of existing powder bed;
    sintering the powder particles to a desired powder layer thickness in the powder bed by using a line laser print head so as to form the printed object;
    wherein the line laser print head can take a simple linear motion to complete a raster scan of an area equal to its width;
    using a controller to control a spatial light modulator having a plurality of light modulating elements to generate a substantially one-dimensional scan line image on the powder bed by directing homogenous light that is transmitted through an anamorphic optical system onto the powder bed;
    wherein the plurality of light modulating elements are arranged in a two-dimensional array and disposed in a path of a homogenous light field such that each the modulating element receives an associated homogenous light portion of the homogenous light field;
    using a positioning mechanism and the controller to change a relative distance between the line laser print head and the powder bed so as to adjust powder layer thickness;
    wherein each modulating element modulates an associated received homogenous light portion such that an associated modulated light portion is directed to the anamorphic optical system;
    using the anamorphic optical system to image and concentrate the associated modulated light portion to form the one-dimensional scan line image on the powder bed;
    wherein the one-dimensional scan line image is anamorphically imaged and concentrated in a process direction.

2. The method of claim 1, wherein the line laser print head causes at the powder bed the laser imaging line.

3. The method of claim 2, wherein the controller at the line laser print head comprises an array of control cells.

4. The method of claim 3, wherein the homogenous light is from at least one $CO_2$ laser, Nd:YAG laser, diode laser, diode laser bar, near IR diode laser, or a combination thereof.

5. The method of claim 4, further comprising:
    causing a 2D pattern image on the powder bed by energizing and moving the line laser print head in a direction perpendicular to a laser imaging line.

6. The method of claim 5, wherein each modulated light corresponds to a pixel of the laser imaging line.

7. The method of claim 2, further comprising:
    using the anamorphic optical system arranged to concentrate the associated modulated light portion such that a concentrated modulated light portions produce an elongated scan line on the powder bed;
    wherein at the elongated scan line said modulated light portions sinter the powder particles in the powdered bed.

8. The method of claim 7, wherein the powder particles can be thermoplastic, metal, or a combination thereof.

9. A single-pass imaging system for forming a printed object by exposing a powder bed with a patterned light, comprising:
    a line laser print head to expose predetermined regions corresponding to a plurality of pixels on a surface of the powder bed with a beam, which has a wavelength in a predetermined wavelength region that includes ultraviolet, and which is emitted from a light source and modulated for each pixel in accordance with image data;
    at least one processor; and
    at least one memory including computer program code for one or more programs, the at least one memory and the computer program code configured to, with the at least one processor, cause the system to perform at least the following:
        transferring a portion of powder particles from a delivery bed to the powder bed;
        wherein the transferring is preparing a layer of fresh powder on top of existing powder bed;
        sintering the powder particles to a desired powder layer thickness in the powder bed by using the line laser print head so as to form the printed object;
        wherein the line laser print head can take a simple linear motion to complete a raster scan of an area equal to its width;
        controlling a spatial light modulator having a plurality of light modulating elements so as to generate a substantially one-dimensional scan line image on the powder bed by directing homogenous light that is transmitted through an anamorphic optical system onto the powder bed;
        wherein the plurality of light modulating elements are arranged in a two-dimensional array and disposed in a path of a homogenous light field such that each the modulating element receives an associated homogenous light portion of the homogenous light field;
        using a positioning mechanism and the controller to change a relative distance between the line laser print head and the powder bed so as to adjust powder layer thickness;
        wherein each modulating element modulates an associated received homogenous light portion such that an associated modulated light portion is directed to the anamorphic optical system;

using the anamorphic optical system to image and concentrate the associated modulated light portion to form the one-dimensional scan line image on the powder bed;

wherein the one-dimensional scan line image is anamorphically imaged and concentrated in a process direction.

10. The single-pass imaging system of claim 9, wherein the line laser print head causes at the powder bed the laser imaging line.

11. The single-pass imaging system of claim 10, wherein the controller at the line laser print head comprises an array of control cells.

12. The single-pass imaging system of claim 11, wherein the homogenous light is from at least one $CO_2$ laser, Nd:YAG laser, diode laser, diode laser bar, near IR diode laser, or a combination thereof.

13. The single-pass imaging system of claim 12, wherein the at least one processor causes a 2D pattern image on the powder bed by energizing and moving the line laser print head in a direction perpendicular to a laser imaging line.

14. The single-pass imaging system of claim 13, wherein each modulated light corresponds to a pixel of the laser imaging line.

15. The single-pass imaging system of claim 14, further comprising:

the anamorphic optical system positioned to receive a directed modulated light portion and arranged to produce an elongated scan line from the directed modulated light portion that is aligned in a cross-process direction.

16. The single-pass imaging system of claim 15, wherein a light modulating element is a spatial light modulator (SLM) that focuses and projects a beam of light.

17. The single-pass imaging system of claim 16, wherein the powder particles can be thermoplastic, metal, or a combination thereof.

18. A non-transitory computer-readable medium storing instructions for controlling using a processor a single-pass imaging system for forming a printed object by exposing a powder bed with a patterned light, the instructions comprising:

loading a plurality of powder particles into a delivery bed of the 3D printer;

transferring a portion of the powder particles from the delivery bed to a powder bed of the 3D printer;

using an anamorphic optical system with light modulating elements to concentrate modulated light portions such that the concentrated modulated light portions produce an elongated scan line on the powder bed;

wherein each light modulating element modulates an associated received homogenous light portion such that an associated modulated light portion is directed in a corresponding predetermined direction;

wherein at the elongated scan line said modulated light portions sinter the powder particles in the powdered bed; and sintering the powder particles to a desired powder layer thickness in the powder bed by using a line laser print head so as to form the printed object;

using a positioning mechanism and the processor to change a relative distance between the line laser print head and the powder bed so as to adjust powder layer thickness;

wherein the transferring is preparing a layer of fresh powder on top of existing powder bed;

wherein the line laser print head can take a simple linear motion to complete a raster scan of an area equal to its width;

wherein the line laser print head causes at the powder bed an imaging line;

wherein the line laser print head comprises one laser or an array of lasers;

wherein a laser is one or more $CO_2$, Nd:YAG laser, diode laser, diode laser bar, near IR diode laser, or a combination thereof.

* * * * *